United States Patent [19]

Dischler et al.

[11] 4,150,739
[45] Apr. 24, 1979

[54] ADJUSTABLE FRICTION CLUTCH FOR PRESSES

[75] Inventors: Helmut Dischler, Neuss; Eduard Huydts, Düsseldorf; Gert Lohmann, Neuss, all of Fed. Rep. of Germany

[73] Assignee: Firma G. Siempelkamp GmbH & Co., Krefeld, Fed. Rep. of Germany

[21] Appl. No.: 848,565

[22] Filed: Nov. 4, 1977

[30] Foreign Application Priority Data

Nov. 6, 1976 [DE] Fed. Rep. of Germany ....... 2650881
Oct. 7, 1977 [DE] Fed. Rep. of Germany ....... 2745142

[51] Int. Cl.² .................... F16D 13/40; F16D 13/68; F16D 69/00
[52] U.S. Cl. ............................................... 192/107 R
[58] Field of Search .................. 192/70.14, 107 R; 188/218 XL

[56] References Cited

U.S. PATENT DOCUMENTS

| | | | |
|---|---|---|---|
| 1,855,533 | 4/1932 | Tower | 192/107 R X |
| 2,135,126 | 11/1938 | Harwood | 192/70.14 X |
| 2,985,273 | 5/1961 | Binder | 192/70.14 |
| 3,237,740 | 3/1966 | Wilson | 192/70.14 X |

*Primary Examiner*—Allan D. Herrmann
*Attorney, Agent, or Firm*—Berman, Aisenberg & Platt

[57] ABSTRACT

A friction clutch assembly, for a press and especially a screw press, includes: a pair of rotating, coaxial, annular, spaced drive members, at least one of which is axially movable toward and away from the other; an off-drive shaft disposed coaxially with the drive members; a spring plate centrally clamped to the off-drive shaft and extending radially on both sides of the shaft to terminate in outer segments, carrying friction coatings, disposed in the space between the drive members, so that, upon movement of one of the drive members toward the other to actuate, or close, the clutch, the friction coatings are clamped between the drive members, elastically deforming the spring plate to adjust to the reduced spacing and to transmit the requisite high torque through the spring plate required to turn the off-drive shaft. Particularly valuable and novel features of the clutch construction are the friction coatings, so arranged on the spring plate that their inside edges, facing toward the off-drive shaft, extend along straight lines perpendicular to a radius starting from the shaft, and means (for clamping the spring plate to the off-drive shaft which have outer edges), also terminating in straight lines parallel to the inside edges of the friction coatings, so that the bending forces applied to the spring plate are along straight lines and in the same direction, thus causing uniform bending of the spring plate and preventing spherical deformations normally obtained with annular drive members and disc-shaped spring plates.

21 Claims, 15 Drawing Figures

ADJUSTABLE FRICTION CLUTCH FOR PRESSES

FIELD OF THE INVENTION

This invention relates to an adjustable friction clutch for a press, particularly for a high torque screw press, having a pair of spaced, coaxial, annular drive members, one of which is movable axially toward and away from the other, an off-drive shaft mounted coaxially with the drive members, a spring plate clamped centrally to the off-drive shaft and extending radially on both sides of the shaft to terminate in outer segments carrying friction coatings disposed in the space between the drive members, so that, upon movement of one of the drive members toward the other to actuate the clutch, the friction coatings are grasped between the drive members, elastically deforming the spring plate to adjust to the reduced spacing and requisite pressure necessary to transmit drive torque from the drive members to the off-drive shaft.

DESCRIPTION OF THE PRIOR ART

In conventional clutches an essentially rigid circular disc is attached to an off-drive shaft in place of the spring plate of the present invention. This circular disc has, along its circumferential edge, on both sides of the disc, certain areas having friction coatings which are grasped by annular drive members when hydraulic pressure cylinders, arranged in the drive members, are impacted with a pressure medium, or when corresponding mechanical devices are activated to move the drive members toward each other and engage the clutch. This arrangement is comparatively complicated and, in particular, requires very accurate control of the hydraulic pressure cylinders so that both sides of the circular disc will be grasped simultaneously by the annular drive members.

Other conventional clutches employ only one drive member which can be shifted in an axial direction but have a circular disc, provided with friction coatings, arranged on an off-drive shaft in an axially-movable manner. Upon activation of the hydraulic cylinder of the movable drive member, the circular disc is then moved, together with the drive member, against the axially-immovable drive member and is clamped between the two drive members. This arrrangement of clutch parts requires a comparatively-great effort or force to be exercised by the elements which shift the circular disc.

Clutches are also known with a spring plate substituted for the rigid disc, which spring plate carries friction coatings along its circumferential edge and which, upon activation of the pressure cylinder or cylinders, is clamped to one drive member, under elastic deformation, with its edge between the two drive members. In this arrangement a circular spring plate has been used, and the friction coatings have been circularly arranged. This construction has encountered difficulties because the circular plate can be deformed only with a relatively great effort, in connection with a relatively small permissable degree of bending, perpendicularly to its plate plane. Radially-uneven heat distribution occurs; this causes additional heavy stresses which can lead to bulging and, in turn, causes the friction coatings to be pressed against the drive members with comparatively great force. As a result there is serious friction wear and attendant further heating and bulging during idling so that it is necessary to make the space between the drive members very large for safety reasons, with resultant long clutch movement distances and long switching adjustment times.

It has been suggested to subdivide the circular spring plate into individual sectors, which at their ends would, in each sector, bear the friction coatings, but this would not eradicate the explained fundamental difficulties resulting from the arrangement of the friction coatings along the circumference of a circular spring plate. Indeed, additional labor to manufacture would be required, and further difficulties in obtaining proper operation of the fabricated clutch would be encountered.

SUMMARY OF THE INVENTION

It is a primary object of the invention to overcome the defects and disadvantages of known clutches, as briefly outlined above, and to provide an adjustable friction clutch having the following improved characteristics: a short switching distance, short switching time, and low pressure medium consumption for its actuation; absence of scrape or drag in spite of the short switching distance, even when the clutch is disengaged; good heat conduction by means of large friction surfaces; and, finally, as small as possible mass-inertia movement of the parts of the clutch on the off-drive side.

To obtain these and other objects, the inventive clutch is constructed with individual friction coatings, or groups of friction coatings, shaped and arranged on spring plates so that their inside edges, facing the off-drive shaft, fall in straight lines perpendicular to a radius starting from the shaft, and the means for clamping the spring plate to the shaft have outer edges which also fall in straight lines parallel to the inside edges of the friction coatings. Thus the bending forces applied to the spring plate are directed along straight lines and in the same direction, causing uniform bending of the spring plate with minimum force and preventing buckling, or curved or spherical deformations, in the spring plate. In such a construction, the spring plate is neither clamped to the off-drive shaft nor grasped at the friction coatings along circular sectors, as in conventional clutches, but is, instead, clamped and grasped along straight lines on both sides of the off-drive shaft. Thus, the spring plate itself is deformed only in a two-dimensional fashion, that is to say, it is exposed to smaller tensions because the bending lines are essentially congruent in planes which extend parallel to the off-drive shaft and perpendicular to the spring plate. The power requirement for the elastic deformation of the spring is considerably less, and the elastic deformation can be accurately determined mathematically even with heat influence, whereas in conventional spring plates, which are clamped along arc-shaped edges, the plate encounters bulge stresses tending to force the plate into spherical shape. In the arrangement according to the invention, there are no uncontrollable, especially spherical, bendings which lead to a spring force which cannot be accurately predicted. The forces required for deformation of the spring plate can be computed easily and are small. Consequently, in the inventive clutch it is possible to use a very small stroke of the axially-movable drive member. Also, the friction coating always remains even or level and is not deformed as the plate is bent. Very small spacings between friction coatings and drive members can be maintained, when the clutch is open, without any danger of the clutch dragging or scraping. There are no undesirable contacts (which would result from unevenness) in the spring plates which bear the friction coatings. In the past it was necessary to maintain a safety spacing of about 3 mm on both sides of the friction coatings, using annular or circular spring discs; but with the inventive clutch a spacing of 1 mm or less is possible. This saves pressure medium for activation of the hydraulic cylinders, for moving the off-drive shaft and its attached elements, and the switching speed of the clutch is greatly increased. As a result of the essentially-parallel course of the inside edges of the individual friction coatings or groups of friction coatings, with respect to the edges or ends of the clamping device, pertaining to the particular sectors of the spring plate, the parts or sectors of the spring plate behave like unilaterally-clamped bars when the clutch is open or like bilaterally-clamped bars when the clutch is closed. Thus, under all circumstances, the bending stresses are uniform over the entire width of the particular segments and are easily calculable or predictable. Spherical deformations of the particular sectors of the spring plate are completely precluded.

The inventive clutch can use two movable drive members instead of one, in which case the spring plate need not be absolutely or completely bendable. Nevertheless, such an arrangement offers considerable advantages as compared, for example, to the use of a circular spring plate because it so happens that heat stresses, developed during operation, will not lead to undesirable bulge tensions in the spring plate and thus to undesirable through-bending of the spring plate. When two movable drive members are used, the spring plate can also be made lighter because the through-bending need not be taken into consideration.

A clutch of the described kind, compared to designs with a circular disc provided with friction coatings arranged in an axially-movable member on the off-drive shaft, presents the advantage that no maintenance or attendance of the axially-movable connection is required, and there is no wear and tear. This also yields lower production costs.

Another advantage of the clutch, according to the invention, is that each friction surface on the drive members describes a circular ring where the difference between the two radii is greater than the width of one friction coating on the spring plate. The friction coatings are thus in contact with larger surfaces of the drive members than is the case with conventional annular friction coatings. This is rather immaterial as far as wear and tear is concerned, because the wear and tear does not take place at the drive members, but on the exchangeable spring-plate friction coatings; but it is of material significance to heat evacuation because considerably larger surfaces of the drive members are heated and therefore used for heat evacuation.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following descriptions of specific embodiments when read in connection with the accompanying drawings, wherein like reference characters indicate like parts throughout the several figures, and in which:

DESCRIPTION OF PREFERRED EMBODIMENTS

Referring now more particularly to FIGS. 1 to 4, the illustrated novel clutch assembly according to the invention has two rotating, annular, drive members 1, 2 driven by conventional means, not shown, which are arranged coaxially with respect to each other, and spaced at an interval from each other so that a slit 3 is formed between them. Drive member 1 can be moved axially (in the direction of the arrows 4) by conventional means (not illustrated), for example a hydraulic cylinder. An off-drive shaft 5 is arranged coaxially with respect to the drive members 1, 2. When drive member 1 is shifted toward drive member 2, frictional coupling (by means to be explained) takes place, and drive torque is transmitted from members 1 and 2 to the off-drive shaft 5. Shaft 5 bears a spring plate that is generally labelled 6, and that engages in slit 3 with its edge portions 7, 8.

Spring plate 6 has a generally rectangular base configuration, is formed of spring steel or other suitable resilient material, and is clamped onto the off-drive shaft 5. The spring plate 6 is clamped, in the sector of the off-drive shaft 5, between an upper and a lower support plate 9 and 10, respectively. These support plates are of a length which roughly corresponds to the width of the spring plate 6. The connection between the spring plate 6 and the support plates 9, 10 is established by rows 11, 12 of screws, or other fasteners, which are arranged in the sector of the longitudinal edges of the support plates 9, 10. Additional screws 13, all around the off-drive shaft 5, reinforce the connection. The arrangement, on the whole, is such that both spring plate 6 and support plates 9 and 10 are held in an axially-immovable and relatively non-rotating manner, for example, due to the engagement of notch teeth 14 on off-drive shaft 5, and are clamped into that shaft. Recesses 15, 16 on the broad sides of the support plates 9, 10 serve to save weight and to reduce the inertial moment.

The longitudinal sides 17, 18 of clamping plates 9, 10 extend parallel to the broad sides 19, 20 of the spring plate 6. Along the broad sides 19, 20 of the spring plate 6 there are strip-shaped, essentially rectangular, edge portions 21, 22 which (both on the top side and the under side of the spring plate 6) carry friction coatings 23, 24 and 25, 26, respectively. The friction coatings may be of any conventional friction material; they are applied as coatings or adhered as strips in a conventional manner. The friction coatings optionally have the shape of strips or, e.g., comprise individual rectangular, circular or other-shaped segments arranged next to each other, provided the arrangement, on the whole, is so made that the insides 27 of the friction coatings 23–26 fall along straight lines, which run essentially parallel to each other and which also run parallel to the longitudinal side 17, 18 of support plates 9 and 10 and perpendicular to a central radius starting from shaft 5 and corresponding to line II—II of FIG. 1.

Figure 1:
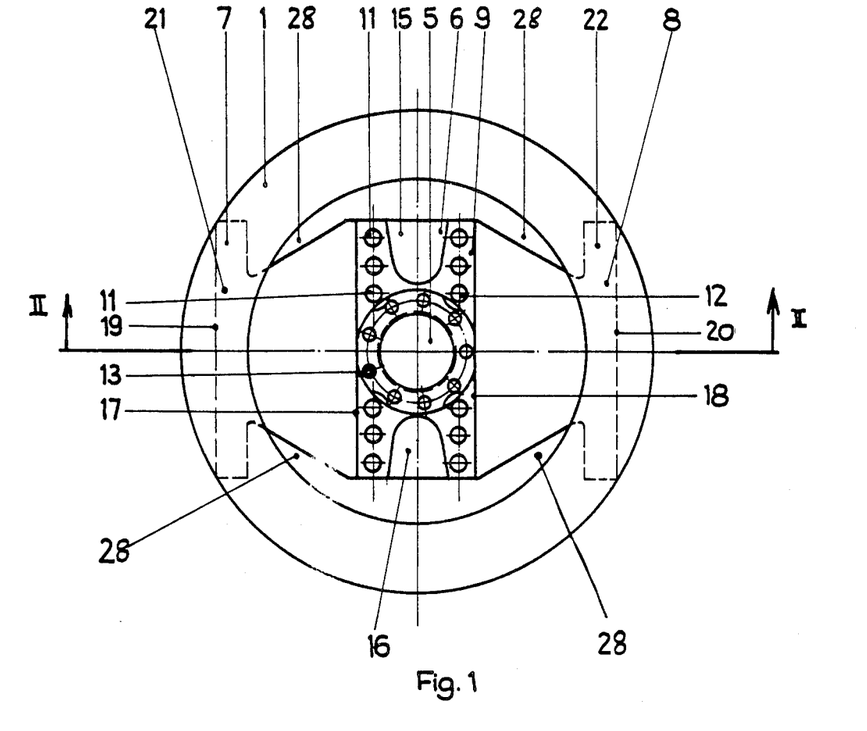
FIG. 1 is a schematic top plan view of a partial clutch assembly according to the invention.
Figure 2:
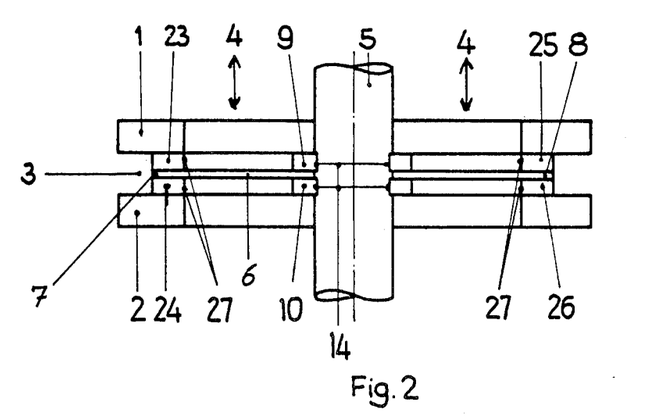
FIG. 2 is a schematic cross-sectional view taken along line II—II of FIG. 1, and looking in the direction of the arrows.
Figure 3:
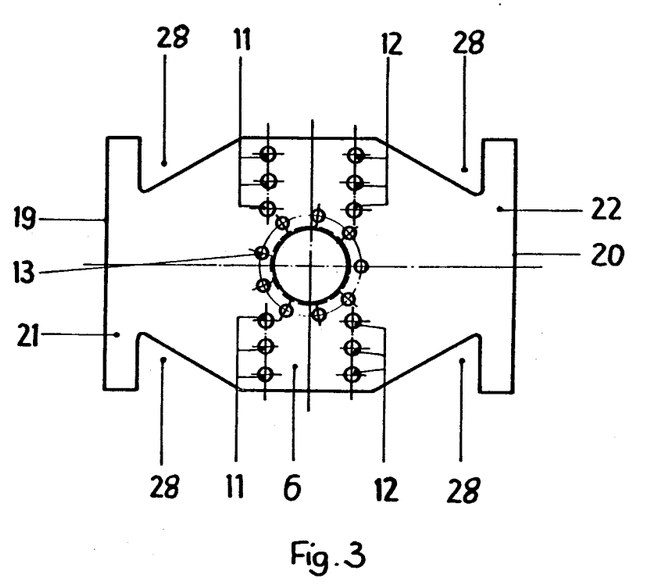
FIG. 3 is a schematic top view of the spring plate of the clutch assembly of FIG. 1.
Figure 4:
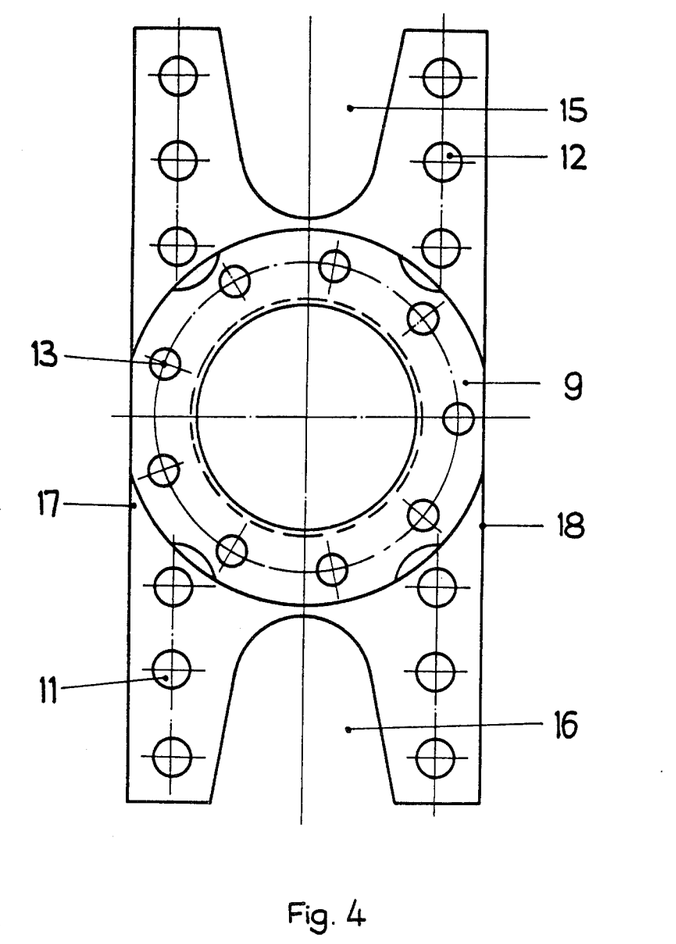
FIG. 4 is a schematic top plan view of the supporting plate of the clutch of FIG. 1.

Spring plate 6, between the sector clamped by support plates 9, 10 and the edge portions 21, 22, along its longitudinal sides has recesses, or cutouts 28, which save material and are so designed that they enable achievement of a uniform distribution of the bending stresses in the deformable sector between longitudinal sides 17, 18 of the support plates and the inside edges 27, 27 of the particular friction coatings.

When the clutch is open, or disengaged, a leeway of less than 1 mm, overall, is provided between the friction coatings 23–26, and the associated friction surfaces of drive members 1, 2. In operation, when the clutch is to be closed, or engaged, drive member 1 is moved axially in the direction of arrows 4, whereupon it engages and grasps the friction coatings 23, 25 and deforms the spring plate 6 until the friction coatings 24, 26 are also grasped by the associated friction surface of drive member 2. In accordance with the existing press-on pressure, the desired torque is then transmitted to off-drive shaft 5. When the clutch is engaged, each side of the spring plate 6 is deformed like a bar clamped at both ends, without any bulge tensions appearing in spring plate 6. Friction coatings 23–26 are grasped by the associated friction surfaces of drive members 1, 2 in a circular sector whose radial width is greater than the width of the friction coatings 23–26 (FIG. 1), so that good heat evacuation over the correspondingly-large friction surfaces of drive members 1, 2 is possible.

Although the shape of the base surface of the spring plate is fundamentally arbitrary, it is desirable that at least the parts of the spring plate, which carry the friction coatings, have a rectangular base surface because this saves material, and is more suitable for supporting the friction coatings.

In particular, the spring plate may have an essentially rectangular base surface with recesses, for easy handling during assembly and dissassembly along those edges that do not have any friction coatings. This saves weight, as a result of which the mass-inertia moment of the driven-off part is reduced. The arrangement and design of the easy-handling recesses or cutouts also achieves a uniform distribution of the bending stresses in the radial direction.

Conditions are optimized when the spring plate is held on the off-drive shaft at least one supporting plate, whose edges, running parallel to the inside of the friction coatings, extends essentially over the entire spring plate. Desirably, as described, the spring plate is optionally clamped, in the sector of the off-drive shaft, between two support plates. Then the spring plate behaves like a bar clamped at both ends when subjected to bending deformation.

In the manufacture of spring plates for very large presses, the plates are comparatively very large, sometimes having surfaces of several square meters. This size of plate is difficult in terms of production engineering. The manufacture and assembly of the spring plate is made simpler and less expensive by making the plate of several separate arms, each of which has one circumferential segment for friction coatings. This makes it possible to equip very large presses with a clutch, according to the invention, where one single arm would have too large a surface, by using a plurality of identical, smaller arms in lieu of a one-piece spring plate, whose order of magnitude would not lend itself to production and handling.

The manufacture of individual arms is less costly because they can be made in larger numbers. Assembling and dismantling are also considerably easier.

Fundamentally, there is gained the possibility of adapting the spring plate to the particular requirements in an optimum fashion. For example, even or odd numbers of arms are possible, and so are symmetrical and asymmetrical arrangements. It must be made certain, however, that the spring plate, comprising the asymmetrically arranged arms, will revolve perfectly, without imbalance.

The arms are, e.g., attached individually to the off-drive shaft with clamping devices. But it is also possible to use a common clamping device for the arms which, for example, consists of two support plates between which the ends of the arms are clamped.

Figure 5:
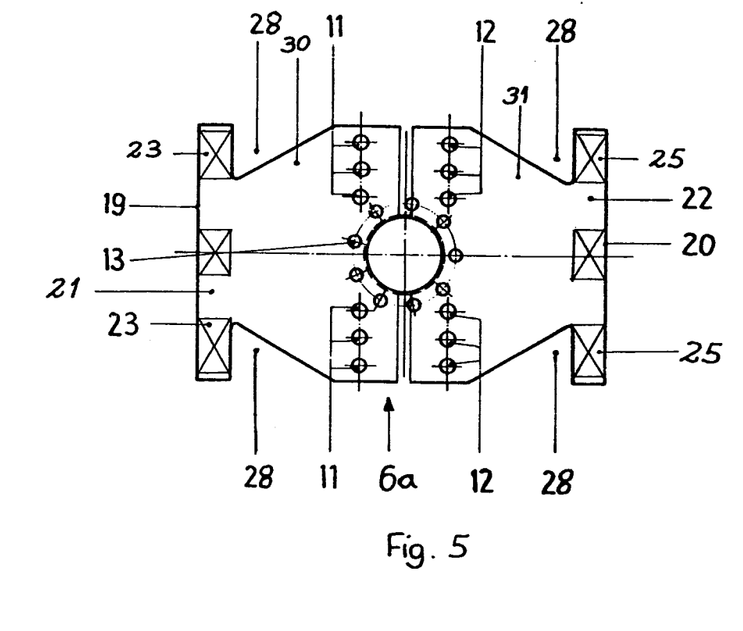
FIG. 5 is a schematic plan view, similar to that of FIG. 3, but showing another embodiment of the spring plate.

To illustrate the preceding, in FIG. 5, the spring plate, generally labelled 6a, comprises two parts, that is two arms 30, 31 which are mutually independent structural parts, but which are clamped together between support plates, such as 9, 10 of FIG. 1. Accordingly, arm 30 with a row of screws 11 and arm 31 with a row of screws 12 are attached to the off-drive shaft by and between the support plates. Each of the arms 30, 31 forms one side of the spring plate, and accordingly, the two outer ends, which form broad sides 19, 20 of the spring plate, in the manner previously described, carry the friction coatings 23, 24 and 25, 26, respectively. These, in FIG. 5, are individual rectangular segments. The friction coatings, however, may have circular, or any other base surfaces, provided their inside edges are arranged along a straight line.

It is advantageous that the clamping edges of the clamping device run parallel to the friction coatings arranged along the particular outer or circumferential segments of the spring arms. As a result, congruent bending lines develop over the cross section of each arm, and the arm is bent in the manner of a guiding spring. Heat expansion, developing during the heating of the arm, cannot lead to the outward bulging of the arm.

Furthermore, it is advantageous to design the arms in such a manner that they each have recesses 28 on their side edges, which run roughly in a radial direction. Because of these recesses, it is possible to adjust the spring characteristic of the arm to particular requirements, which means that the acceleration or deceleration of the arms and of the off-drive shaft connected to them can be accomplished very quickly while engaging or disengaging the clutch.

In place of the two arms 30, 31 illustrated in FIG. 5, the invention also includes the provision of additional arms (in an even or uneven number) in a symmetrical or, possibly, asymmetrical arrangement. Accordingly, the support plates would then be designed, in each case, to form a clamp edge, corresponding to the longitudinal sides 17 or 18 of FIG. 1, for the corresponding arm, so that the clamp edge runs parallel to the inside edges of the friction coatings arranged on the particular arm.

Figure 6:
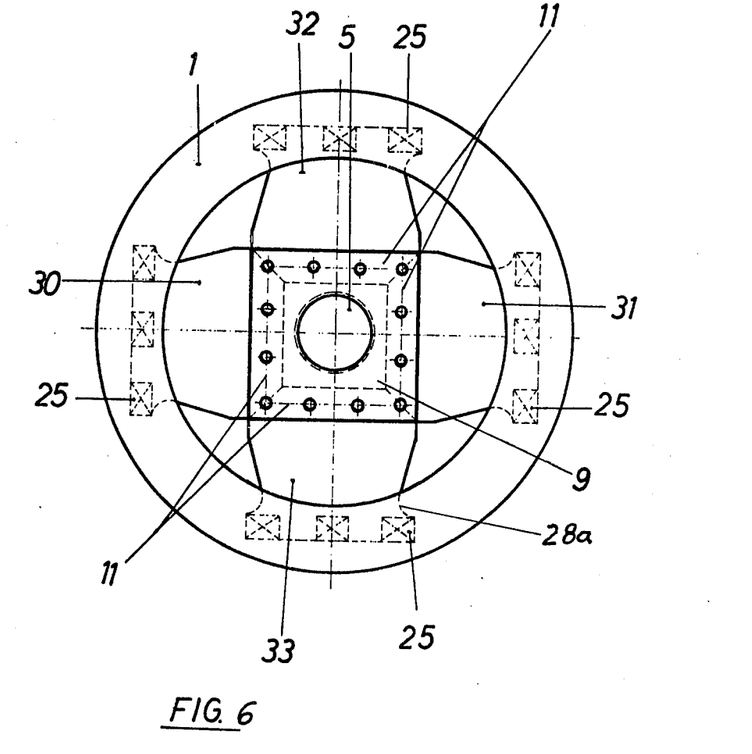
FIG. 6 is a schematic top plan view, similar to that of FIG. 1, but showing another embodiment of a partial clutch assembly according to the invention.

In the version illustrated in FIG. 6, the spring plate comprises four individual arms 30, 31, 32, 33 (in a symmetrical arrangement), which are clamped with rows of screws 11 between support plates 9. Although each of the upper and lower support or clamping plates is of one-piece construction, one of the plates is optionally made in several parts, thus making assembly and dismantling of the spring-plate assembly easier.

Figure 7:
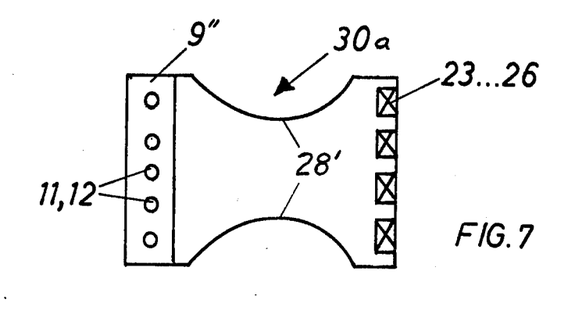
FIGS. 7 to 9 are schematic plan views of examples of various arms of a spring plate according to the invention.

Arms 30–33 of spring plate 6 can, as described in connection with FIG. 3, use lateral cutaway portions, notches or recesses 28a, which serve not only to save weight, but also to achieve a uniform bending stress over the length 5 of the arms between the clamp, formed by support plates 9 and friction coatings 23–26. Another arm, designed in this fashion, is illustrated in FIG. 7 at 30a. As can be seen from the figure, arm 30a (in the sector of the support plate 9'' and in the area of the friction coatings 23–26) has relatively great bending and notching resistance. In the area between, there are cutouts or recesses 28' along the longitudinal sides of the arms so that the bending resistance is reduced in this area. These cutouts also save weight. It should be understood that all of the arms illustrated in FIGS. 7–14 are intended to be used in pairs, or double pairs as in FIG. 6, or in other multiples in a given clutch. The clutch of FIG. 6 operates in the same manner as described for the clutch of FIG. 1, and this is true also of clutches made with modified arms, as described in the other and remaining figures.

Figure 8:
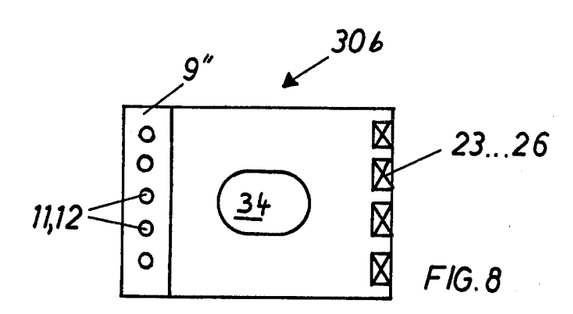

In the embodiment illustrated in FIG. 8, the arm 30b has an opening 34 located in the middle of the arm and passing therethrough, instead of the lateral recesses 28', 28' of FIG. 7. Opening 34, however, performs the same functions in the same manner as cutouts 28'.

Figure 9:
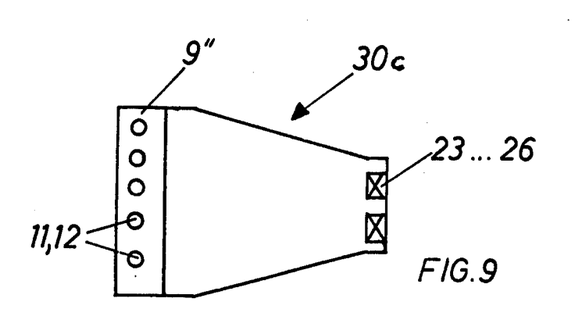

Another modified embodiment of the spring plate arm is shown at 30c in FIG. 9. In this arm the width decreases from the support plate 9'', which serves to clamp it (toward the friction coatings 23–24) so that the arm (shown in plan view) has the shape of a trapezoid. This design results in a particularly low mass inertia moment for the arm.

Figure 10:
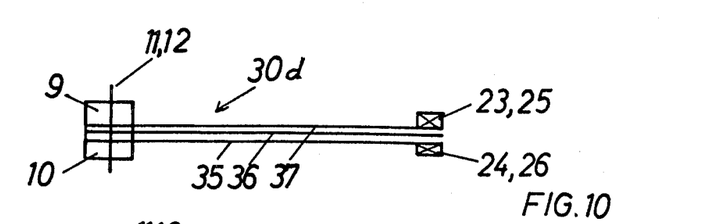
FIGS. 10 to 14 are schematic elevations of examples of spring plates showing their cross-sectional configurations.

The modified arm 30d, shown in cross section in FIG. 10, comprises three equally long and similarly shaped spring leaves 35–37, of which the outer spring leaves 35 and 37 carry friction coatings 23, 25 and 24, 26, respectively. With this design a favorable spring characteristic can be achieved, while the arm will have light weight. Because of the pressure, exerted upon the friction coatings when the clutch is closed or engaged, the spring leaves 35 and 37 are pressed against spring leaf 36, so that the leaf 36 likewise contributes to the transmission of the torque. If necessary, it is possible to attach friction coatings between spring leaves 35 and 36, and 36 and 37, respectively.

Figure 11:
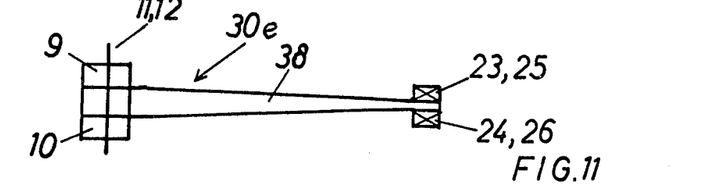

In the modification illustrated in FIG. 11, the thickness of the spring leaf 38, serving as arm 30e, decreases outwardly along its length from the portion clamped by support plates 9, 10 toward the portion having friction coatings 23–26. This enables achievement of good spring characteristics combined with a small mass inertia moment for the arm. Although FIG. 11 illustrates a trapezoidal cross section of the spring leaf 38, it is possible to use a spring leaf whose cross section does not decrease in a linear manner.

Figure 12:
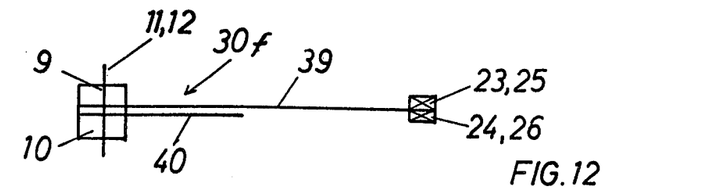
Figure 13:
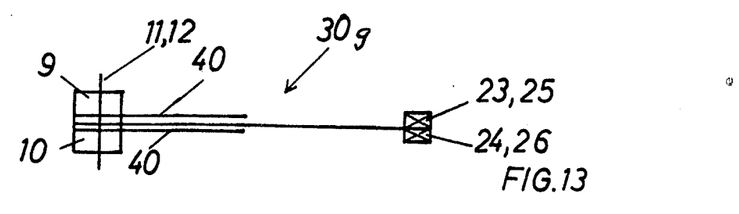
Figure 14:
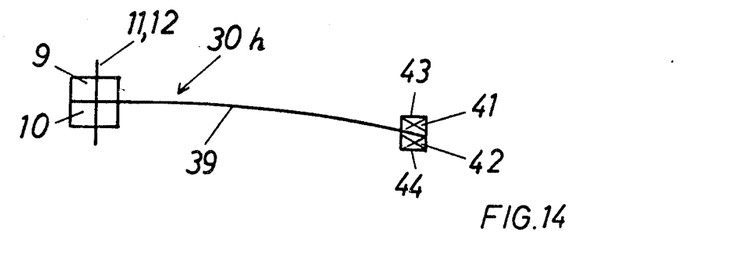

In FIG. 12, the spring arm 30f comprises the spring leaf 39, which carries friction coatings 23–26, and a shorter support spring leaf 40 arranged thereunder. The arms 30g and 30h of FIGS. 13 and 14 are slightly different. In FIG. 13 there are arranged, both above and below spring leaf 39 (carrying friction coatings 23–26), support spring leaves 40, whose lengths are each shorter than the length of spring leaf 39. The design according to FIG. 12 is preferred when, during operation of the clutch, spring leaf 39 is expected to bend in the direction of support spring leaf 40. The design according to FIG. 13, utilizing a second support spring 40 above the leaf 39, is preferred when, during operation of the clutch, the spring leaf 39 can be bent in both up and down directions.

FIG. 14 shows modified friction coatings, recommended when spring leaf 39, upon closing or engaging the clutch, is always bent in the direction illustrated in the figure. As can be seen in the figure, the friction coatings 41, 42, in contrast to previously-described friction coatings 23–26, do not have individual rectangular cross sections, but their contact surfaces with spring leaf 39 are inclined so that their working surfaces 43, 44 are not parallel to, but rather are at an angle with, spring leaf 39. The inclinations are complementary so that friction coatings 41 and 42, together, have a rectangular overall cross section. In this way it is made certain that, as the clutch is engaged, the working surfaces of the friction coatings will immediately come completely to rest against the parts which drive the clutch.

In plan view, spring leaves 35–40 of FIGS. 10–14 can be rectangular or may have forms corresponding to those of FIGS. 7–9, and it is entirely possible for the forms and dimensions of the spring leaves of one arm in a clutch to deviate from those of another in the same clutch.

In all of the previously-described embodiments of the spring plate and its arms, the clutch according to the invention permits the transmission of very high torques.

Figure 15:
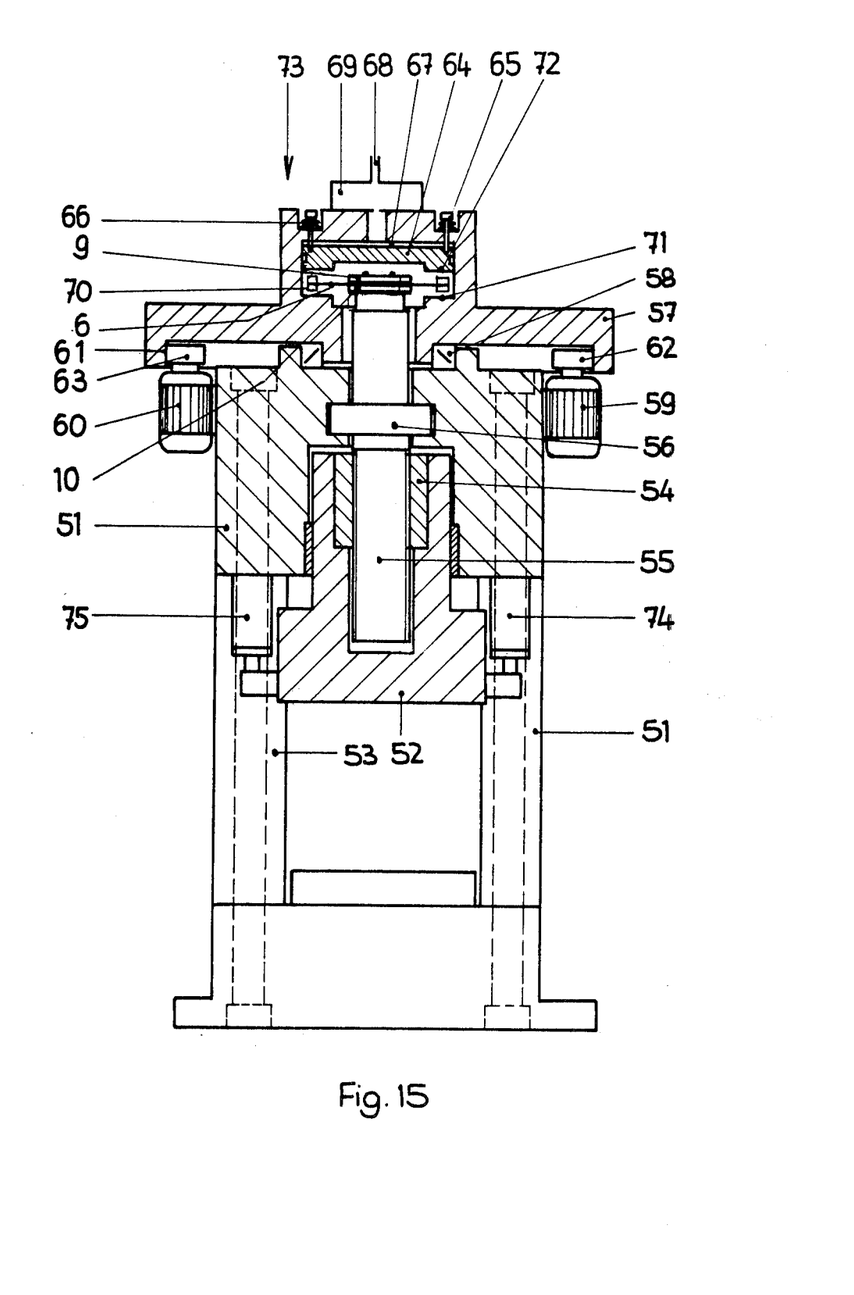
FIG. 15 is a schematic longitudinal section of a press comprising an adjustable friction clutch according to the invention.

For better understanding FIG. 15 shows a longitudinal section of a press which is equipped with an adjustable friction clutch according to the invention. In FIG. 15 reference numeral 51 is the press frame. In the press frame 51 a press piston carrier 52 is non-rotatably guided in guide means 53. A nut 54 is fixedly arranged in the press piston carrier 52 on which nut the thread of a spindle 55 is rotatably received. A bearing or abutment 56 prevents vertical movement of the spindle 55 relatively to the press frame 51. On top of the press frame 51 a fly-wheel 57 is rotatably arranged on bearings 58, the fly-wheel 57 being driven by electric motors 59, 60, the shafts of which engage with the inner flange 61 of the fly-wheel via friction rollers 62, 63. Alternatively other drive means, e.g. an electric motor fastened to press frame 51 and an endless belt engaging the outer flange of the fly-wheel may be used for rotating the fly-wheel 57. Inside the fly-wheel 57 a piston 64 is concentrically arranged for rotation with the fly-wheel and for limited axial movement with respect to the fly-wheel. The piston 64 is normally held in its uppermost position by springs 65, 66 unless pressed downwards by compressed air which is fed into the cylinder 67 via port 68 and control means 69.

On top of the spindle 55 a spring plate, generally labelled 6, is fastened between upper and lower support plates 9 and 10 for rotation with the spindle 55, the spring plate 6 carrying friction coatings which are generally labelled 70 both on its top side and under side. Associated friction surfaces 71, 72 (which are referred to as drive members 2 and 1 in FIG. 2), generally extending parallel to spring plate 6, are concentrically provided inside fly-wheel 57 and on piston 64, respectively. In operation, when the clutch is to be closed or engaged, piston 64 is pressed downwards in the direction of arrow 73 by compressed air which is fed into cylinder 67 via port 68 and control means 69, causing friction coatings 70 to engage with friction surfaces 71 and 72 and thereby rotating spindle 55 and causing press piston carrier 52 to move downwards in the direction of arrow 73 until cylinder 67 is depressurised and springs 65, 66 pull piston 64 upwards against the direction of arrow 73, whereby the clutch is disengaged or opened. Spring means 74, 75, which are connected to press piston carrier 52 with their one ends and to piston frame 51 with their other ends, pull press piston carrier 52 upwards against the direction of arrow 73 after the clutch has been disengaged. Compressed air cylinders may be used instead of spring means 74, 75.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. In a friction clutch of the type comprising a pair of rotatable, coaxial, annular, spaced drive members, at least one of the drive members being axially movable, an off-drive shaft mounted coaxially with the drive members, a spring plate having friction coatings along its outer edges, and clamping means securing the spring plate at its center to the off-drive shaft, the said outer edge friction coatings of the spring plate being disposed in the space between the drive members so that, upon movement of said one of the drive members axially toward the other to activate and engage the clutch, the said outer edges and friction coatings are clamped between the drive members, elastically deforming the spring plate, the improvements wherein said friction coatings are so arranged on the spring plate that their inside edges, facing toward the off-drive shaft, extend along straight lines that are perpendicular to a radius starting from the center of said off-drive shaft, and said clamping means extends outwardly from the off-drive shaft and terminates along straight lines which are parallel to said lines of the inside edges of the friction coatings, thus causing uniform bending of the spring plate and preventing spherical deformation because of the annular shape of the drive members.

2. A clutch according to claim 1, wherein the attached surfaces of said friction coatings are inclined in a direction radial of the off-drive shaft so that a pair of friction coatings on opposite sides of the spring plate together form a rectangle in cross section.

3. A clutch according to claim 1, wherein said friction coatings are continuous rectangular strips.

4. A clutch according to claim 1, wherein said friction coatings are segments arranged next to each other.

5. A clutch according to claim 1, wherein at least portions of said spring plate near the outer edges, which carry the friction coatings, are of rectangular shape.

6. A clutch according to claim 1, wherein said spring plate is rectangular with cut-out portions along its side edges which do not carry friction coatings, thus reducing the weight of the spring plate.

7. A clutch according to claim 1, wherein said clamping means includes at least one supporting plate, whose outer edges run parallel to the inner edges of the friction coatings, and which extends over the entire width of the spring plate.

8. A clutch according to claim 6, wherein said spring plate is clamped between two support plates defining said clamping means in a sector of the off-drive shaft.

9. A clutch according to claim 1, wherein said spring plate is formed of a plurality of separate arms, each of which has a segment carrying the friction coatings which are disposed in the circumferential space between said pair of drive members.

10. A clutch according to claim 9 wherein said spring plate is formed by an even number of arms.

11. A clutch according to claim 9, wherein said plurality of arms are symmetrically arranged with respect to the off-drive shaft.

12. A clutch according to claim 9, wherein each of said arms has a cut-out portion removed from each of its side edges.

13. A clutch according to claim 9, wherein each of said arms has a cut-out portion removed centrally therefrom.

14. A clutch according to claim 9, wherein said clamping means comprises a common pair of supporting plates between which the plurality of spring plate arms are clamped to the off-drive shaft.

15. A clutch according to claim 14, wherein said supporting plates of the clamping means have outer edges parallel to the friction coatings, which are arranged on outer segments of the arms forming the spring plate.

16. A clutch according to claim 14, wherein the width of each of said arms decreases from the outer edges of the support plates, forming the clamping means, toward the segment carrying the friction coatings.

17. A clutch according to claim 14, wherein each of said arms is formed by a spring leaf having a thickness which decreases from the area clamped by the supporting plates toward the segment carrying the friction coatings.

18. A clutch according to claim 9, wherein each of the arms comprises a plurality of parallel spring leaves disposed in the axial plane of the clutch, parallel to each other.

19. A clutch according to claim 18, wherein each of said spring leaves has the same length.

20. A clutch according to claim 18, wherein one of said spring leaves is shorter than another and is arranged on the side of the longer leaf in the direction of bending of the longer leaf, said longer leaf carrying the friction coatings.

21. A clutch according to claim 20, wherein an additional shorter spring leaf is disposed on the opposite side of said longer spring leaf with respect to said first shorter leaf.

* * * * *